Nov. 28, 1950 M. H. LIPTON 2,532,260
COMBINED SMOKE GENERATOR AND CONDITIONER
Filed Sept. 10, 1946 2 Sheets-Sheet 1
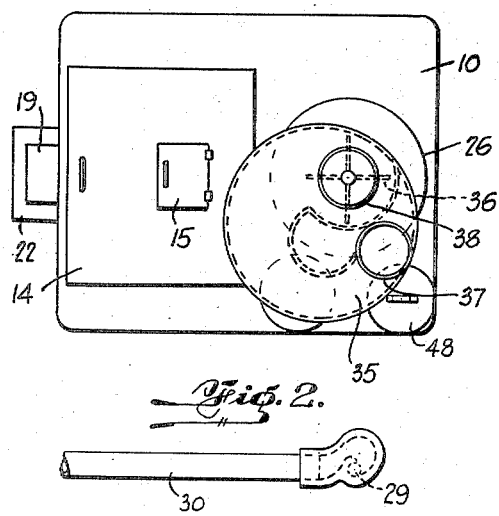
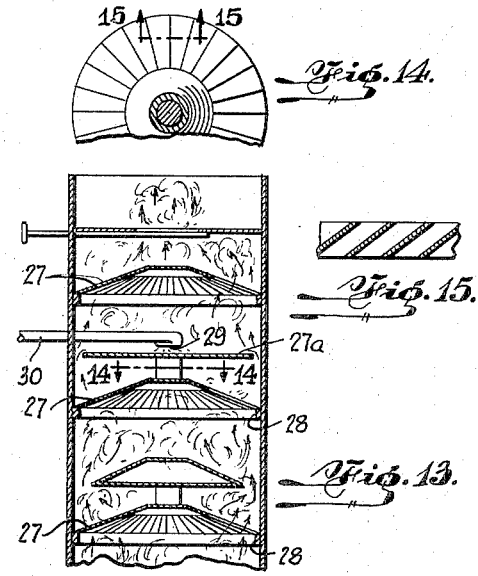
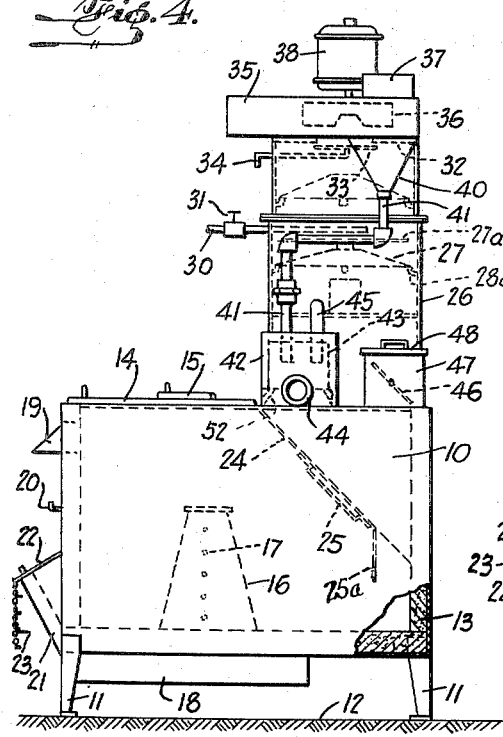
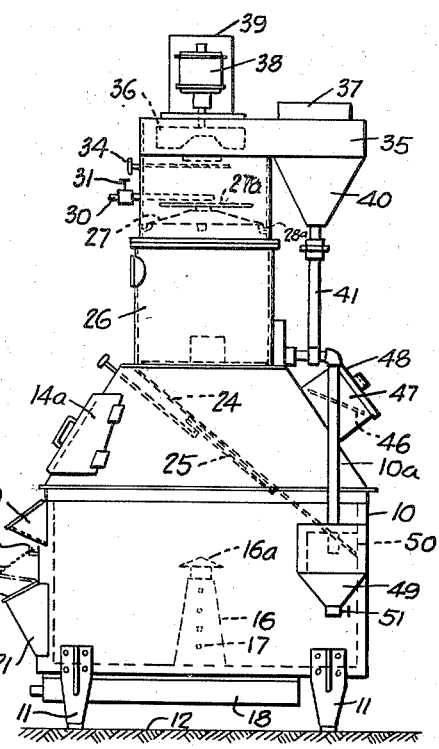
INVENTOR.
MARTIN H. LIPTON.
BY Percy Freeman
ATTORNEY.

Nov. 28, 1950     M. H. LIPTON     2,532,260
COMBINED SMOKE GENERATOR AND CONDITIONER
Filed Sept. 10, 1946     2 Sheets-Sheet 2
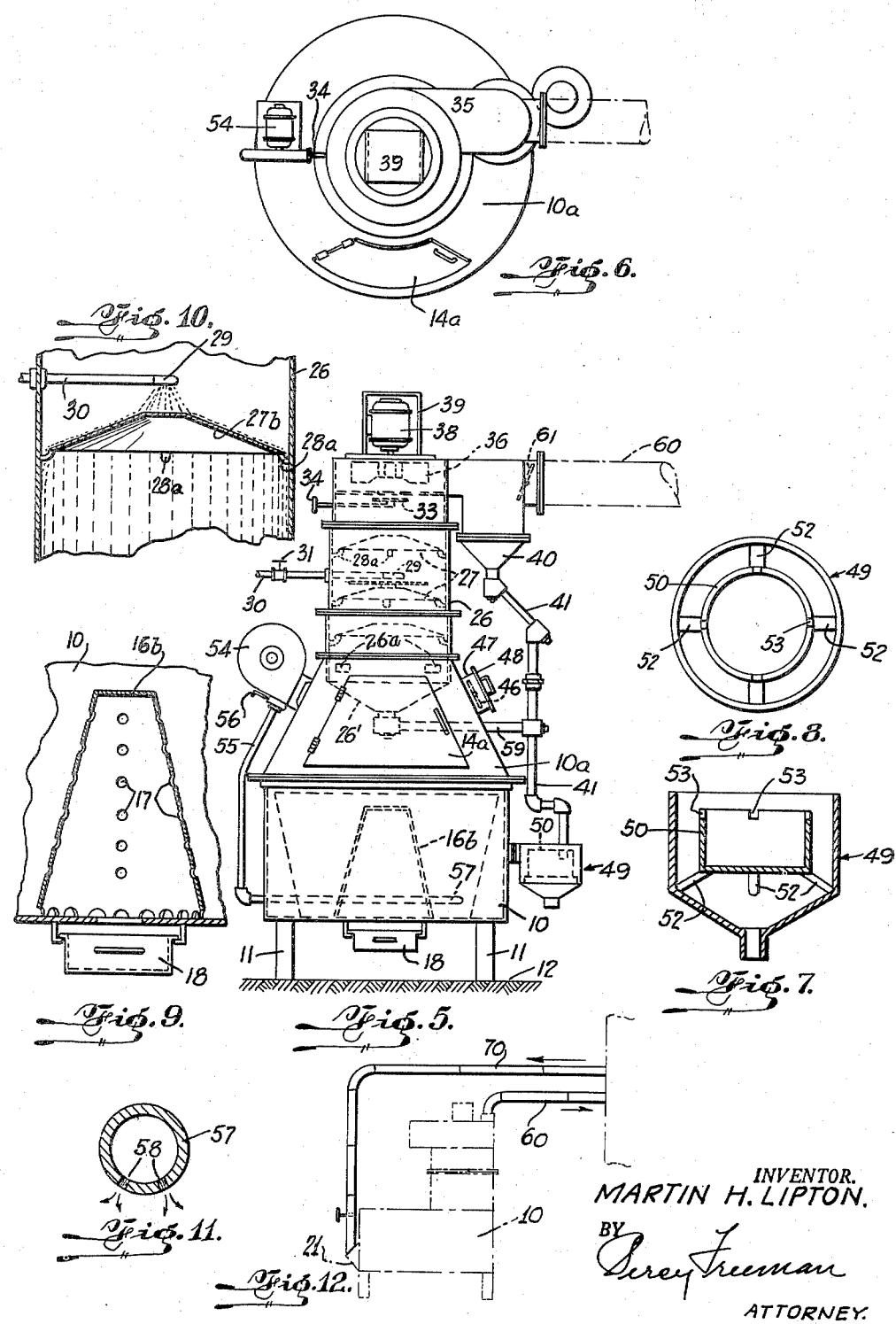
INVENTOR.
MARTIN H. LIPTON.
BY Percy Freeman
ATTORNEY.

Patented Nov. 28, 1950

2,532,260

UNITED STATES PATENT OFFICE 2,532,260

COMBINED SMOKE GENERATOR AND CONDITIONER

Martin H. Lipton, Forest Hills, N. Y.

Application September 10, 1946, Serial No. 695,915

1 Claim. (Cl. 183—21)

The present invention relates to a device which is adapted to supply conditioned smoke for food smoking purposes and for any other purpose where smoke treatment is desired.

The art of food smoking is an ancient one which has been and still is largely carried out in primitive fashion. While a number of different devices have been proposed from time to time, so far as I am aware, there is no really satisfactory device available which can produce superior smoked foods such as those resulting from the use of my present invention. Despite careful operation of prior devices, smoked foods produced thereby suffer from one or more of the following disadvantages: discoloration or undue darkening of color, strong and unpalatable taste, excessive dryness, and deposition of soot or ash upon the food.

The purpose of smoking foods is to impart a desired smoke taste and to effect a certain dehydration which prolongs the keeping qualities of the food. Smoking also coagulates a part of the protein content and deposits antisepticizing phenols, creosotes, etc. on the food. Smoke ingredients such as pyroligneous acid and formic acid impart definite and pleasing taste qualities. Smoke produced from the incomplete combustion of hickory or other hardwood sawdust is preferred but unless smoking is carefully carried out, the food becomes darkened due to deposits of soot, ash, etc. and loses its desired appearance. The use of smoke blowers tends to aggravate this condition instead of helping. If the smoke is too hot, excessive drying occurs especially on the surface of the food, and natural fats and oils are either destroyed or volatilized. A smoke which is too cool lacks the power to bring about the desired changes and requires inordinate lengths of time and amounts of sawdust. Moreover, improper or excessive smoking actually destroys the flavor of the food and renders it bitter so that the practice has developed in some quarters of drying the food with a separate source of heat other than the heat developed by the partial combustion of hardwood sawdust. This, however, is unduly complicated and expensive, and it is unnecessary when smoking is correctly carried out. Thus it will be appreciated that there must be a nicely balanced set of conditions to produce a delicately flavored, properly dehydrated smoked food, such as meat or fish, or cheese, having just the right appearance and gustatorial qualities.

The primary object of my invention is to carry out smoking of food with conditioned smoke which will produce a product having just the desired qualities of taste and appearance.

Another object of my invention resides in a device which will consistently produce such conditioned smoke in a simple, reliable manner at a moderate cost.

A further object of the invention resides in the various structural features hereinafter described and claimed which make up my novel and highly useful smoke producing device.

A still further object of the invention comprises the removal of deleterious ingredients from smoke produced for food smoking purposes without interfering with or removing the desirable smoke constituents and without unduly cooling the smoke.

Other and further objects and advantages will be understood by those skilled in this art or will be apparent or pointed out hereinafter.

In the accompanying drawings:

Fig. 1 is a side elevational view of a food smoking device embodying my invention.

Fig. 2 is a plan view of the device of Fig. 1.

Fig. 3 is an elevation of a modified device.

Fig. 4 is a detail of the water supply pipe.

Fig. 5 is a front elevation of a further modified form of device.

Fig. 6 is a plan view of Fig. 5.

Fig. 7 is a vertical section through the collecting receptacle for excess creosotes, tarry matter, etc.

Fig. 8 is a plan view of Fig. 7.

Fig. 9 is a fragmentary detail view of the vent pipe and ash receptacle of Fig. 5.

Fig. 10 is a sectional detail view of a modification showing an arrangement for scrubbing the smoke with water.

Fig. 11 is a detail section of the terminal portion of the combustion control pipe.

Fig. 12 is an elevation showing pipe connections for recirculating smoke.

Fig. 13 is a fragmentary vertical section showing in detail the preferred form and arrangement of baffles and water distributing plate.

Fig. 14 is a partial sectional view taken on line 14—14 of Fig. 13.

Fig. 15 is a partial sectional view taken on line 15—15 of Fig. 14.

Referring first to Figs. 1 and 2, the numeral 10 designates a metallic combustion chamber mounted on legs 11 to raise it above the supporting surface 12. This chamber is lined with a suitable fireproof lining 13 and has a door 14 in its top, which has a small inspection door 15 set thereinto. An air vent pipe 16 having a plurality of apertures 17 is disposed in the bottom of chamber 10 and a slidable ash removal drawer 18 is located beneath chamber 10 and vent pipe 16. The front of the combustion chamber is provided with an auxiliary air inlet 19, a hook 20 and a draft chamber 21 with a cover 22 and draft adjusting links 23 which can be connected at various links to hook 20 to maintain cover 22 in the desired position. A diagonal baffle 24 extends across a portion of chamber 10 and is provided with a draft regulator 25 accessible through door 14.

Baffle 24 is located under the scrubbing chamber 26 which is mounted on combustion chamber 10. Chamber 26 is provided with one or more cone frustums or baffles 27 supported at spaced points by brackets or a ledge 28. The conical baffles 27 are preferably constructed with radial louvers, as shown in Figs. 13, 14 and 15. Above the center of at least one of the conical baffles is the spray manifold 29 of water supply pipe 30, preferably constructed as shown in Fig. 4. A water distributor disc 27a is supported axially intermediate the conical baffle and the water outlet 29, as best seen in Fig. 13. Pipe 30 is mounted in the wall of chamber 26 and has a control valve 31 just outside the chamber. The upper somewhat reduced portion of chamber 26 has an annular flange 32 forming a restricted outlet opening which is controlled by a disc 33 having a control handle 34 projecting out of chamber 26 and by means of which the outlet opening can be partially or wholly closed or opened. The housing or scroll 35 of blower fan 36 is mounted on the top of chamber 26 and has a connection 37 which leads to a duct connecting with one or more smoke-houses (not shown). Blower fan 36 is driven by a motor 38 which is usually mounted in a framework 39 (Fig. 5).

A funnel 40 is connected into scroll 35 below outlet 37 and by means of suitable piping 41 delivers liquid fractions of the smoke to a collector 42 containing an overflow pot 43, and having a drain pipe 44 connected to a server or other disposal system. An outlet 45 is also provided for chamber 26. A chimney damper 46 located in chimney outlet 47 and covered at 48, is mounted atop the combustion chamber 10.

As will be appreciated from the use of like numerals, the device of Fig. 3 is essentially the same as that of Fig. 1. In Fig. 3, however, the vent pipe has a conical shield 16a superimposed on it and the intermediate portion 10a of the device tapers upwardly, being of frusto-conical shape. Access door 14a is located in this portion, as shown. In addition, piping 41 leads to a collecting receptacle, 49, which is similar to collector 42 in Fig. 1 and containing an overflow pot 50 (like 43 in Fig. 1) and valved at the bottom as at 51. Figs. 7 and 8 show the detailed structure in which receptacle 49 (or 42) has an upper cylindrical portion and a lower funnel-shaped portion with braces or supports 52 for overflow pot 50 (or 43), the latter having ports 53 in its upper edge.

Fig. 5 is similar to Figs. 1 and 3 in many respects, although the vent pipe 16b differs slightly in its shape. Fig. 9 shows that the air vent pipe is frusto-conical, closed at the top and provided with spaced rows of apertures 17 and a horizontal row of apertures at its bottom. In Fig. 5, a supplemental blower 54 is mounted on portion 10a of the device and via pipe 55, having an adjusting gate 56, forces air out through a ring-shaped diffuser 57 (Fig. 11) which is apertured at 58 to direct air downwardly at angles of 22½° or thereabouts, from the vertical. Conical louvered baffles 27 are employed which act to distribute the rising smoke. Liquids in portion 26 (Fig. 5) drop into the funnel-shaped bottom 26' and flow through branch pipe 59 into piping 41 where it joins condensate or liquids descending from the scroll or housing of blower fan 36 as the smoke is centrifugally forced into duct 60, dampered at 61, whence it proceeds to one or more smoke houses and partially to a stack (not illustrated). If it be desired to recirculate the smoke, then the arrangement illustrated in Fig. 12 may be used. As is here shown, the pipe 60 leads to the smoke houses while pipe 70 may extend from the smoke houses to return smoke to the unit for retreatment and for mixing with fresh smoke.

In Fig. 10 is shown a modification of the water distributor. An imperforate frusto-conical disc 27b is supported in chamber 26 on brackets 28a, with the periphery of the disc being spaced from the wall of the chamber 26.

In operation, sawdust, wood chips or other suitable fuel is placed in the combustion chamber and ignition commenced in any desired manner. The combustion chamber is provided with the required air supply through members 16, 19 and 21 and controlled to prevent excess air from causing too complete combustion. A forced supply of air is optionally injected as in Fig. 5 and the downwardly travelling air turns upwardly to create a draft. Blower fan 35 pulls smoke upwardly under control of a draft regulator and the structure illustrated in Figs. 10 and 13 causes the smoke to pass through a thin curtain of water which washes and scrubs it to remove dirt, ash, soot and water-solubles. Control over the action of blower fan 36 can be effected by appropriate adjustment of disc 33 by handle 34. The smoke then passes to a duct which leads to one or more smoke houses but liquids and condensate drop into funnel 40 and flow into an overflow pot in which creosotes and phenols collect, the heavier ingredients settling in the overflow pot and the lighter fractions spilling through ports 53 and passing down to a disposal system. In this way, it is possible to recover components which are removed from the smoke so that only clean conditioned smoke passes to the smoke houses. Surprisingly, it has been found that the conditioned smoke has not been unduly cooled and has a substantially constant temperature and composition which accomplishes smoking without the deleterious side effects heretofore resulting. Proteins are coagulated, for example, without discoloration or undue darkening, the food being a clear light shade of superior appearance. Substances destroying flavors or causing bitterness are eliminated or minimized so that subtle, pleasant gustatory qualities are produced. In every respect a better, more uniform smoked food is produced which is markedly different from prior products.

The foregoing is presented as illustrative and not as limitative and, within the terms of the appended claim, various other modifications may be resorted to without departing from the spirit or principles hereof.

Having thus described my invention, what I claim as new and desired to secure by Letters Patent, is:

A device for washing smoke comprising a smoke scrubbing chamber into which the unwashed smoke is passed, a first means for drawing the smoke through said chamber, a second means for removing undesired constituents from the smoke, and a third means for directing the treated smoke into a separate path of travel from the undesired constituents, said first-named means including a scroll atop the scrubbing chamber and a blower fan therewithin, together with a control below the scroll for controlling the admission of smoke to said scroll, said second means including a structure for forming a water curtain through which the smoke is forced for initially treating the smoke, said third means including an upwardly directed outlet for the smoke and a downwardly directed funnel-shaped outlet for the undesired constituents, the centrifugal force of the blower fan serving to throw remaining undesired constituents from the initially scrubbed smoke to fall into the funnel-shaped outlet, a collector for said undesired constituents and an overflow pot in said collector to retain the solid matter while permitting water to flow off from said constituents.

MARTIN H. LIPTON.

REFERENCES CITED

The following references are of record in the file of this patent:

UNITED STATES PATENTS

| Number | Name | Date |
|---|---|---|
| 847,906 | Clark | Mar. 19, 1907 |
| 889,694 | Lambert | June 2, 1908 |
| 1,123,232 | Brassert | Jan. 5, 1915 |
| 1,560,333 | Carty | Nov. 3, 1925 |
| 1,699,424 | Brdar | Jan. 15, 1929 |
| 1,820,161 | Rzeczkowski | Aug. 25, 1931 |
| 1,979,630 | Lea | Nov. 6, 1934 |
| 2,184,185 | Gerhold | Dec. 19, 1939 |
| 2,265,857 | Reynoldson | Dec. 9, 1941 |
| 2,358,508 | Hersch | Sept. 19, 1944 |
| 2,365,675 | Blumstengal | Dec. 26, 1944 |
| 2,387,345 | Pearl | Oct. 23, 1945 |

FOREIGN PATENTS

| Number | Country | Date |
|---|---|---|
| 470,515 | Great Britain | Aug. 17, 1937 |